United States Patent
Chen et al.

(10) Patent No.: US 10,821,602 B2
(45) Date of Patent: Nov. 3, 2020

(54) CARRIER FOR ROBOT AND ROBOT HAVING THE SAME

(71) Applicant: AEOLUS ROBOTICS CORPORATION LIMITED, Hong Kong (HK)

(72) Inventors: Sheng-Chia Chen, Taipei (TW); Sheng-Chih Lin, Taipei (TW); Chia-Chun Li, Taipei (TW)

(73) Assignee: AEOLUS ROBOTICS CORPORATION LIMITED, Wanchai (HK)

(*) Notice: Subject to any disclaimer, the term of this patent is extended or adjusted under 35 U.S.C. 154(b) by 246 days.

(21) Appl. No.: 15/857,474

(22) Filed: Dec. 28, 2017

(65) Prior Publication Data
US 2019/0202052 A1  Jul. 4, 2019

(51) Int. Cl.
| B25J 9/16 | (2006.01) |
| B25J 5/00 | (2006.01) |
| B25J 11/00 | (2006.01) |
| B25J 9/00 | (2006.01) |
| B25J 19/00 | (2006.01) |
| B25J 19/02 | (2006.01) |

(52) U.S. Cl.
CPC ............ *B25J 9/162* (2013.01); *B25J 5/007* (2013.01); *B25J 9/0009* (2013.01); *B25J 9/1684* (2013.01); *B25J 9/1697* (2013.01); *B25J 11/008* (2013.01); *B25J 19/0029* (2013.01); *B25J 19/021* (2013.01); *G05B 2219/40298* (2013.01)

(58) Field of Classification Search
CPC . B25J 9/162; B25J 5/007; B25J 9/0009; B25J 9/1684; B25J 11/008; B25J 19/0029; B25J 19/021; B25J 17/0241; B25J 13/00; G05B 2219/40298; G06N 3/008; G06F 16/285; G10L 15/1815; B62D 57/032; H04W 72/0453; H04W 76/20; H05K 5/0226; H05K 5/023; A01B 69/008; E05D 7/00; H01L 51/0097
See application file for complete search history.

(56) References Cited

U.S. PATENT DOCUMENTS

| 4,170,840 | A * | 10/1979 | Ogawa ................ A63H 33/003 446/95 |
| 6,493,606 | B2 * | 12/2002 | Saijo ........................ B25J 13/00 700/245 |
| 6,580,969 | B1 * | 6/2003 | Ishida ................ B62D 57/032 180/8.1 |

(Continued)

FOREIGN PATENT DOCUMENTS

JP  2015/019833  2/2015

OTHER PUBLICATIONS

Albers et al., Upper Body of a new Humanoid Robot—the Design of ARMAR III, 2006, IEEE, p. 308-313 (Year: 2006).*

(Continued)

*Primary Examiner* — McDieunel Marc
(74) *Attorney, Agent, or Firm* — Fenwick & West LLP

(57) ABSTRACT

In some embodiments, a robot comprises a movable base and a torso arranged on the base. The torso comprises a first portion mounted to the base; a second portion installed to the first portion, wherein the second portion could be moved relative to the first portion; and a support substantially connected to the second portion.

20 Claims, 12 Drawing Sheets

(56) References Cited

U.S. PATENT DOCUMENTS

| | | | |
|---|---|---|---|
| 6,580,970 B2* | 6/2003 | Matsuda | B25J 17/0241 |
| | | | 318/568.1 |
| 6,604,021 B2* | 8/2003 | Imai | G06N 3/008 |
| | | | 318/568.11 |
| 6,640,160 B2* | 10/2003 | Takahashi | B25J 19/005 |
| | | | 318/568.1 |
| 9,275,347 B1* | 3/2016 | Harada | G06F 16/285 |
| 10,242,666 B2* | 3/2019 | Monceaux | G10L 15/1815 |
| 2012/0185095 A1 | 7/2012 | Rosenstein et al. | |
| 2015/0139766 A1 | 5/2015 | Cousins | |
| 2016/0207193 A1 | 7/2016 | Wise | |

OTHER PUBLICATIONS

Park et al., Mechanical design of humanoid robot platform KHR-3 (KAIST Humanoid Robot 3: HUBO), 2005, IEEE, p. 321-326 Year: 2005).*

Cao et al., Design and development of a two-DOF torso for humanoid robot, 2016, IEEE, p. 46-51 (Year: 2016).*

Tiejun et al., The development of a mobile humanoid robot with varying joint stiffness waist, 2005, IEEE, p. 1402-1407 (Year: 2005).*

European Patent Office, Extended European Search Report, European Patent Application No. 18213712.5, dated Jun. 3, 2019, 17 pages.

* cited by examiner

CARRIER FOR ROBOT AND ROBOT HAVING THE SAME

BACKGROUND

1. Field

The instant disclosure relates to a carrier for robot and a robot having the same.

2. Description of Related Art

A robot may be designed to move and/or carry an object to save manpower and to avoid risks of injury, and such robot can perform the aforesaid operation in a factory, in a hospital, at home, etc.

However, it is challenging to lift and/or move an object having a relatively heavy weight, a relatively great size/dimension, an irregular shape, or an asymmetric structure (e.g., a chair) by arms of the robot. Challenges of the above-mentioned operation may include arms of the robot may not have sufficient power to lift and/or move a relatively heavy object. Challenges of the above-mentioned operation may include holding balance while lifting and/or moving an object having a relatively great size/dimension, an irregular shape, or an asymmetric structure.

SUMMARY

According to one exemplary embodiment of the instant disclosure, a robot comprises a movable base and a torso arranged on the base. The torso comprises a first portion mounted to the base, a second portion installed to the first portion and a support substantially connected to the second portion. The second portion could be moved along an axial direction of the first portion, and the support will be moved along with the movement of the second portion.

According to another exemplary embodiment of the instant disclosure, a robotic comprises a movable base and a torso arranged on the base. The torso comprises a first portion mounted to the base, a second portion installed to the first portion, a robotic arm connected to the second portion and a support arranged at the front of the second portion. The second portion could be moved along an axial direction of the first portion, and the support and the robotic arm will be moved along with the movement of the second portion.

According to another exemplary embodiment of the instant disclosure, a robotic comprises a movable base and a torso arranged on the base. The torso comprises a first portion mounted to the base, a second portion installed to the first portion, a support connected to one side of the second portion and a robotic arm connected to the other side of the second portion. The second portion could be moved along an axial direction of the first portion, and the support and the robotic arm will be moved along with the movement of the second portion.

According to another exemplary embodiment of the instant disclosure, a robot comprises a movable base, a telescopic torso arranged on the base and a support mounted to the torso. The torso has at least two portions arranged in a telescopic manner and thus could be variable in length. The support moves upwardly and downwardly while a length of the torso is varied.

According to another exemplary embodiment of the instant disclosure, a robot comprises a movable base, a telescopic torso arranged on the base, a support arranged at the front of the torso and a robotic arm connected to the torso. The torso has at least two portions arranged in a telescopic manner and thus could be variable in length. The support and the robotic arm move upwardly and downwardly while a length of the torso is varied.

According to another exemplary embodiment of the instant disclosure, a robot comprises a movable base, a telescopic torso arranged on the base and a support connected to one side of the torso and a robotic arm connected to the other side of the torso. The torso has at least two portions arranged in a telescopic manner and thus could be variable in length. The support and the robotic arm move upwardly and downwardly while a length of the torso is varied.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
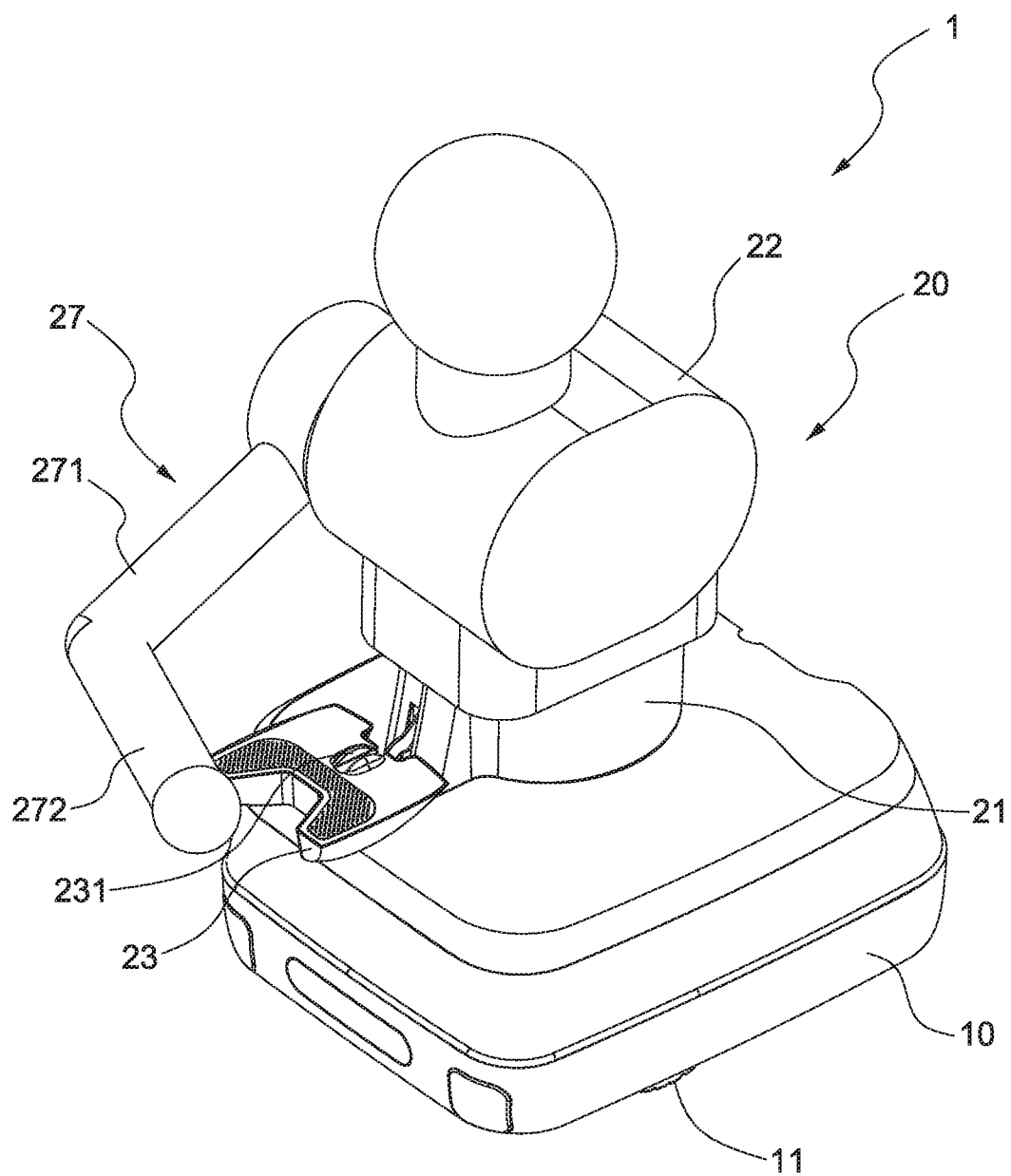
FIG. 1 is a perspective schematic view of a robot with a support in accordance with an embodiment of the instant disclosure.
Figure 2:
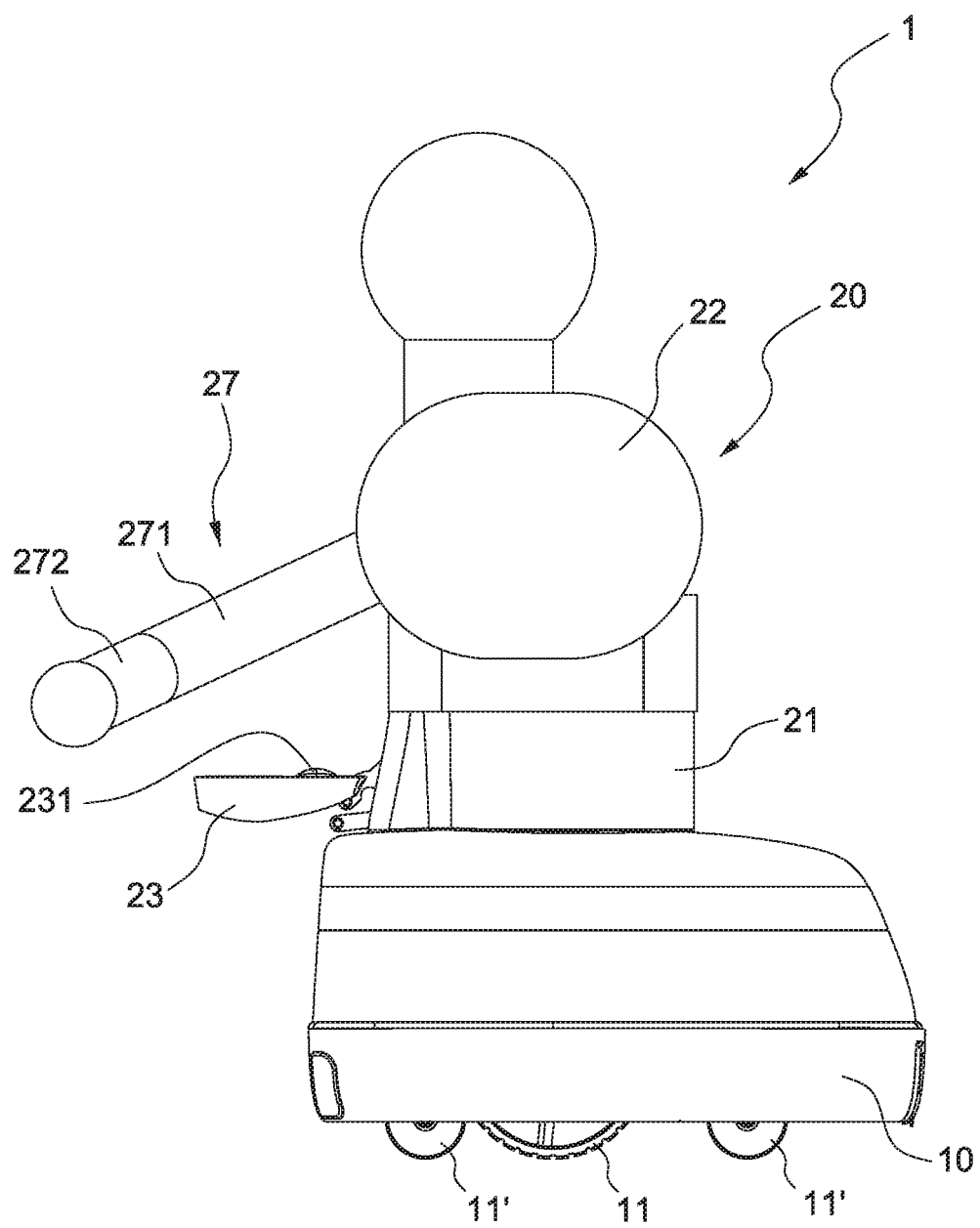
FIG. 2 is a side schematic view of a robot with a support in accordance with an embodiment of the instant disclosure.
Figure 3:
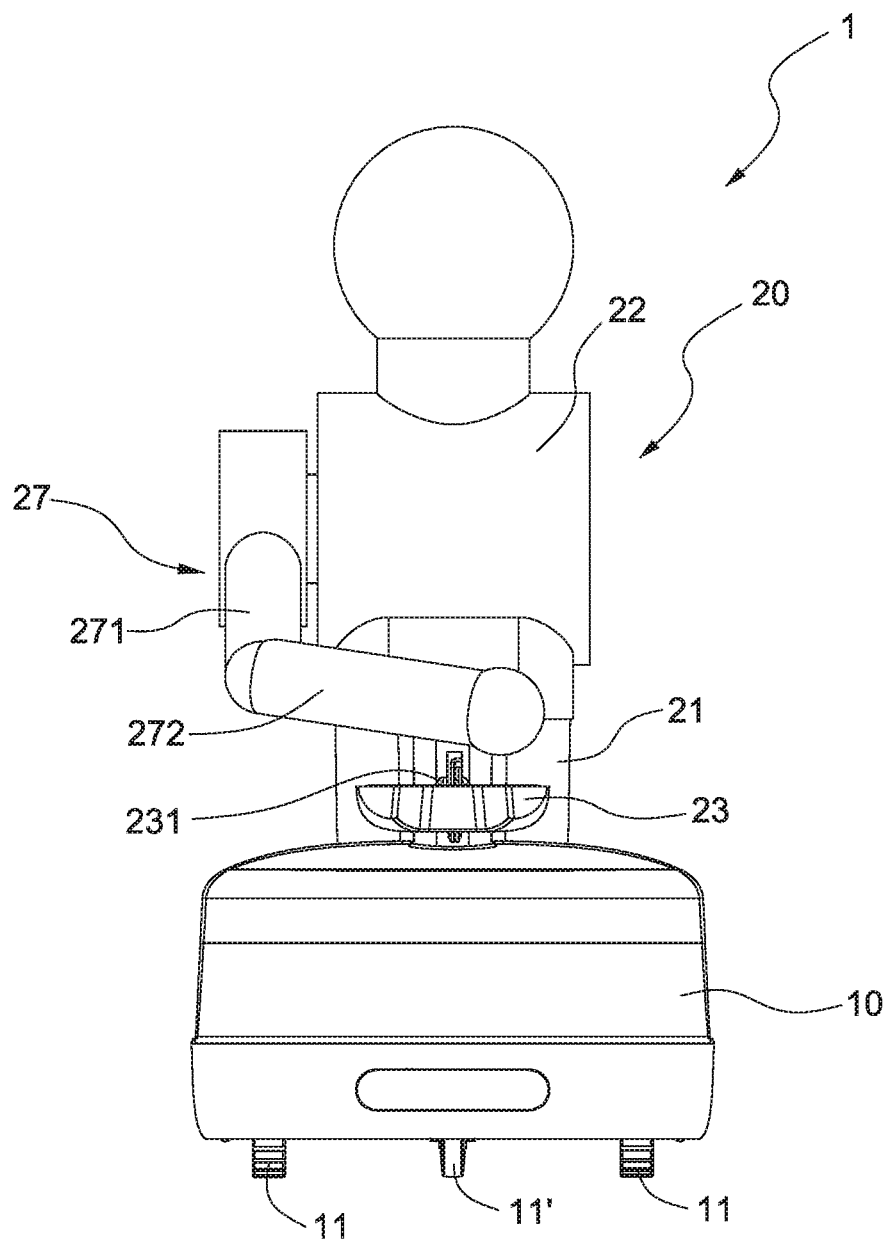
FIG. 3 is a front schematic view of a robot with a support in accordance with an embodiment of the instant disclosure.

FIGS. 1, 2 and 3 show a robot with a support in accordance with an embodiment of the instant disclosure. The robot 1 comprises a movable base 10 and a torso 20. The movable base 10 comprises a plurality of wheels 11 and 11' such that the robot 1 could be movable. The torso 20 comprises a lower portion 21 and an upper portion 22. The lower portion 21 is fixedly mounted to the movable base 10.

The upper portion 22 is substantially installed to the lower portion 21. Such combination of the lower portion 21 and the second portion causes the torso 20 to be telescopic. Further, the robot 1 comprises a liner actuator 30 (see FIG. 4). The linear actuator 30 will drive the upper portion 22 to move relative to the lower portion 21 and along an axial direction of the torso 20. That is, the torso 20 could be variable in length when the upper portion 22 and the lower portion 21 are moved axially relative to each other in a telescopic manner by the linear actuator 30.

The robot 1 further comprises a support 23. The support 23 is substantially connected to the upper portion 22 of the torso 20. That is, the support 23 will move upwardly and downwardly when the upper portion 22 moves relative to the lower portion 21. Moreover, the support 23 comprises a joint 231 such that the support 23 could be foldable.

In addition, the robot 1 further comprises a robotic arm 27. The robotic arm 27 comprises an upper unit 271 and a lower unit 272. One end of the upper unit 271 is substantially connected to one side of the upper portion 22 of the torso 20 and the other end of the upper unit 271 is connected to the lower unit 272. The upper unit 271 has at least one degree of freedom with respect to the upper portion 22 of the torso 20 and the lower unit 272 has at least one degree of freedom with respect to the upper unit 271. Moreover, since the robotic arm 27 is connected to the upper portion 22 of the torso 20, the robotic arm 27 will move upwardly and downwardly when the upper portion 22 moves relative to the lower portion 21.

Figure 4:
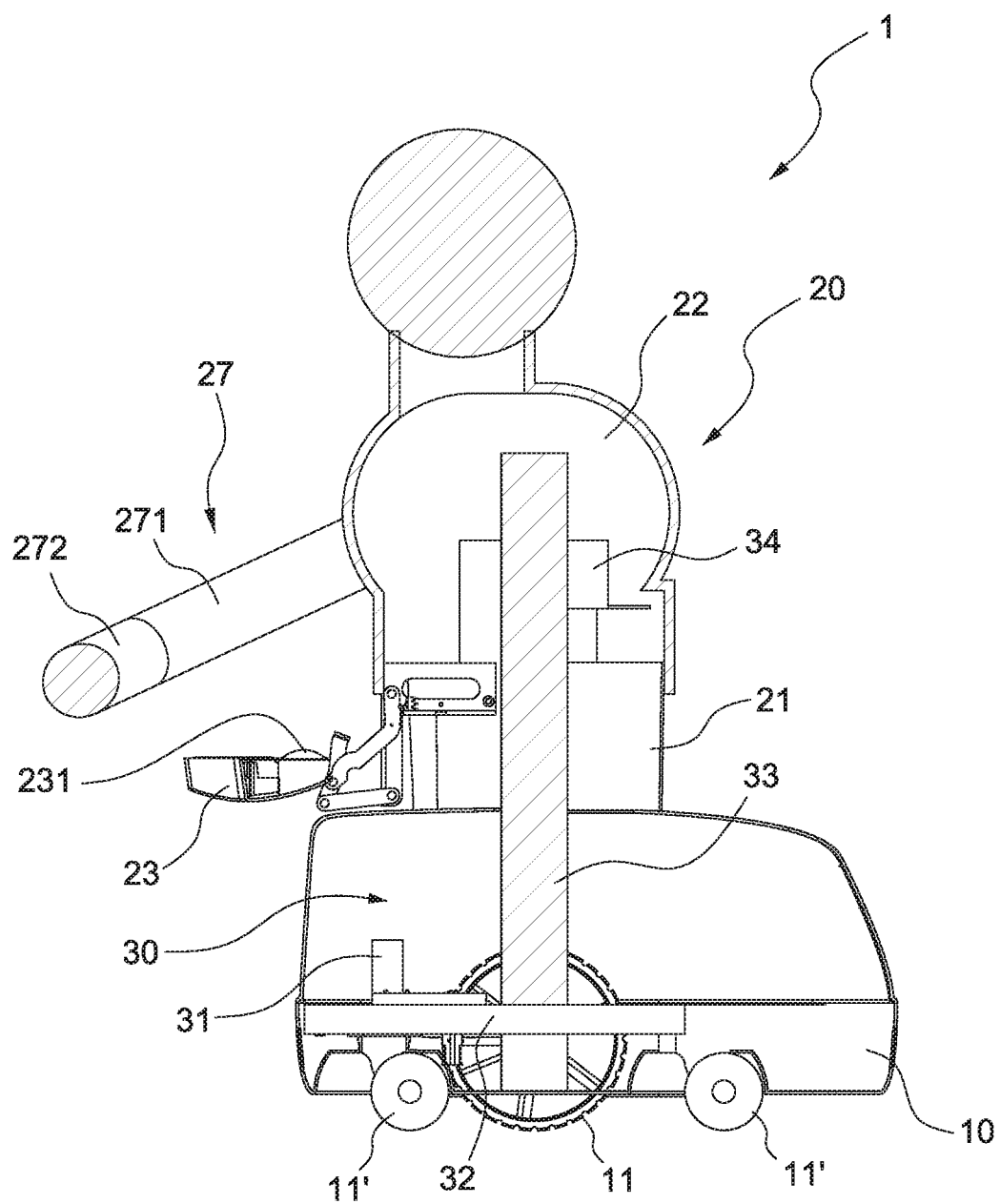
FIG. 4 is a schematic view showing a linear actuator arranged in a robot with a support in accordance with an embodiment of the instant disclosure.

FIG. 4 is a schematic view showing a linear actuator arranged in a robot with a support in accordance with an embodiment of the instant disclosure. The linear actuator 30 is arranged within the robot 1 and comprises a motor 31, a gear reducer 32, a screw rod 33 and a lifting platform 34. The motor 31 and the gear reducer 32 are substantially arranged within the movable base 10 and the motor 31 is connected to the gear reducer 32. The screw rod 33 is connected to the gear reducer 32 and axially extends into the interior of the torso 20. More precisely, the screw rod substantially extends along the longitudinal axis of the torso 20. The lifting platform 34 is screwed at the screw rod 33 and fixedly connected to the upper portion 22. Further, referring to FIG. 4, the support 23 is connected to the lifting platform 34.

When the motor 31 is started, the gear reducer 32 will drive the screw rod 33 to rotate. Once the screw rod 33 rotates, the lifting platform 34 will move along the screw rod 33. Such linear motion of the lifting platform 34 will drive the upper portion 22 and the support 23 to move upwardly or downwardly relative to the lower portion 21. That is, when the liner actuator 30 is actuated, the upper portion 22 is axially moved relative to the lower portion 21 in a telescopic manner and thus the length of the torso 20 is varied. Meanwhile, the support 23 will be moved along with the movement of the second portion 21.

FIGS. 5A-5D show that a robot with a support in accordance with an embodiment of the instant disclosure moves/lifts an article.

Figure 5A:
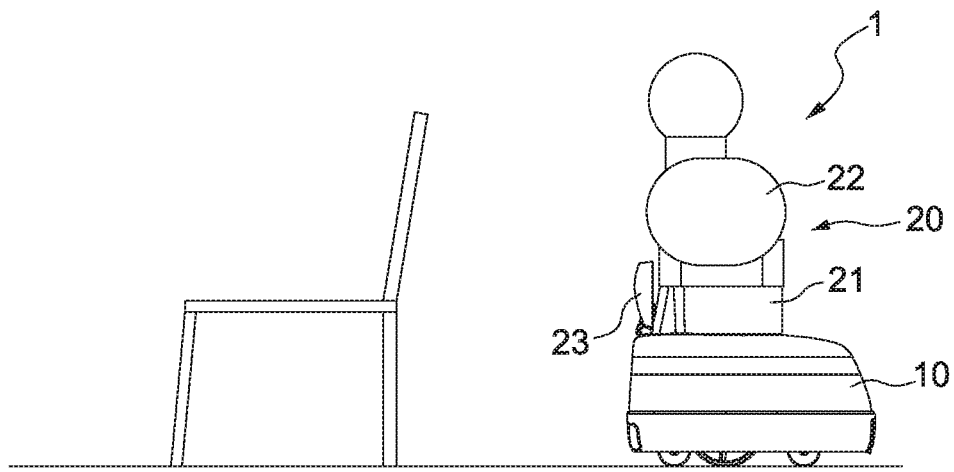
FIGS. 5A-5D are schematic views showing that a robot with a support in accordance with an embodiment of the instant disclosure moves/lifts an article.

Referring to FIG. 5A, when the robot 1 will move and/or lift an article, such as a chair 9, the robot 1 will move close to the chair 9 by the movable base 10. As shown in FIG. 5A, since the robot 1 does not lift the chair 9 yet, the support 23 could be foldable so as to be close to the front face of the torso 20.

Figure 5B:
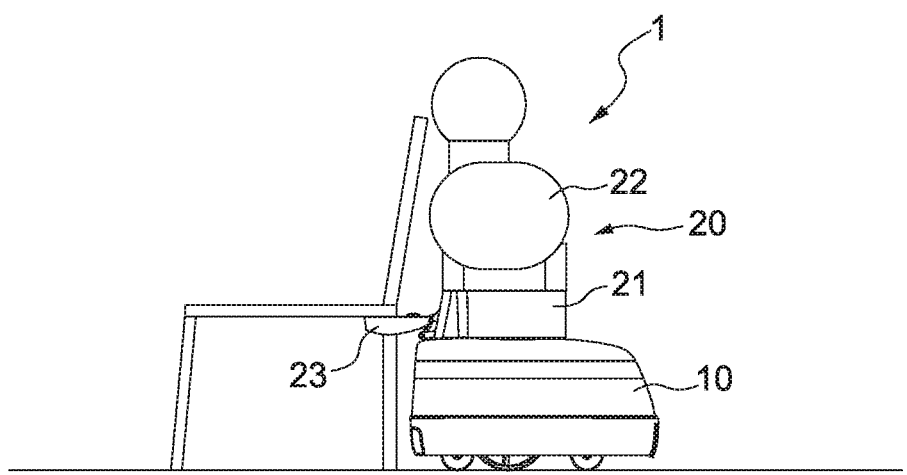

Referring to FIG. 5B, when the robot 1 moves close to the chair 9, the support 23 could be unfolded and against the underneath of the chair surface of the chair 9.

Figure 5C:
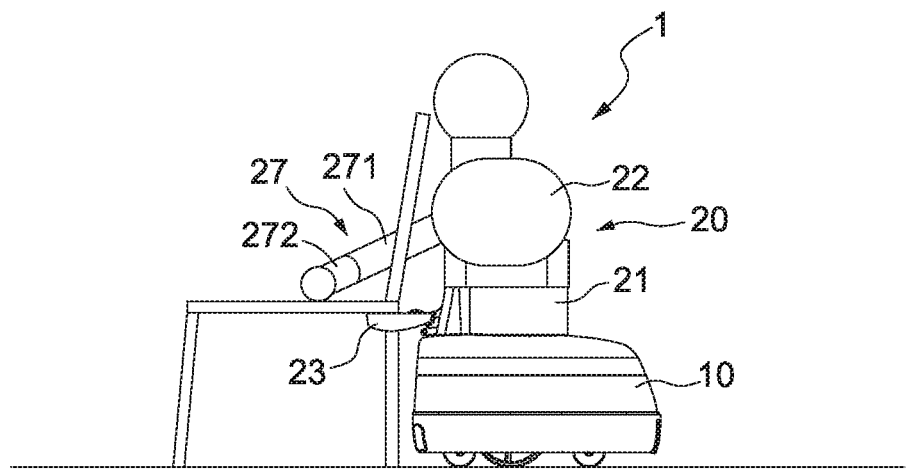

Referring to FIG. 5C, the robot 1 further moves the robotic arm 27 so as to support the chair back of the chair 9. In such a manner, the chair 9 is tightly held by the support 23 and the robotic arm 27 of the robot 1.

Figure 5D:
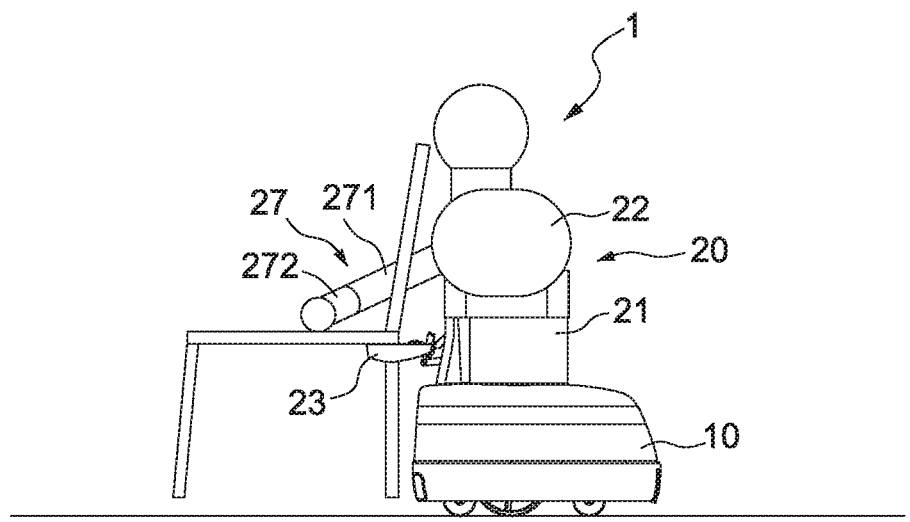

Referring to FIG. 5D, after the chair 9 is tightly held by the support 23 and the robotic arm 27 of the robot 1, the linear actuator 30 is actuated to drive the upper portion 22 to upwardly move relative to the lower portion 21. Meanwhile, the support 23 and the robotic arm 27 move up accordingly. Due to the upward movement of the support 23 and the robotic arm 27, the chair 9 is lifted up by the support 23 and the robotic arm 27 of the robot 1. After the chair 9 is lifted up by the support 23 and the robotic 27 of the robot 1, the robot 1 can further move the chair 9 to a desired place.

In addition, the robot 1 may further comprise an inertial measurement unit (IMU) sensor (not shown) for measuring the robot's specific force and angular rate during the handling process, or/and a sensor (not shown) for monitoring electrical characteristic of the support 23, or/and an optical sensor (not shown).

Figure 6:
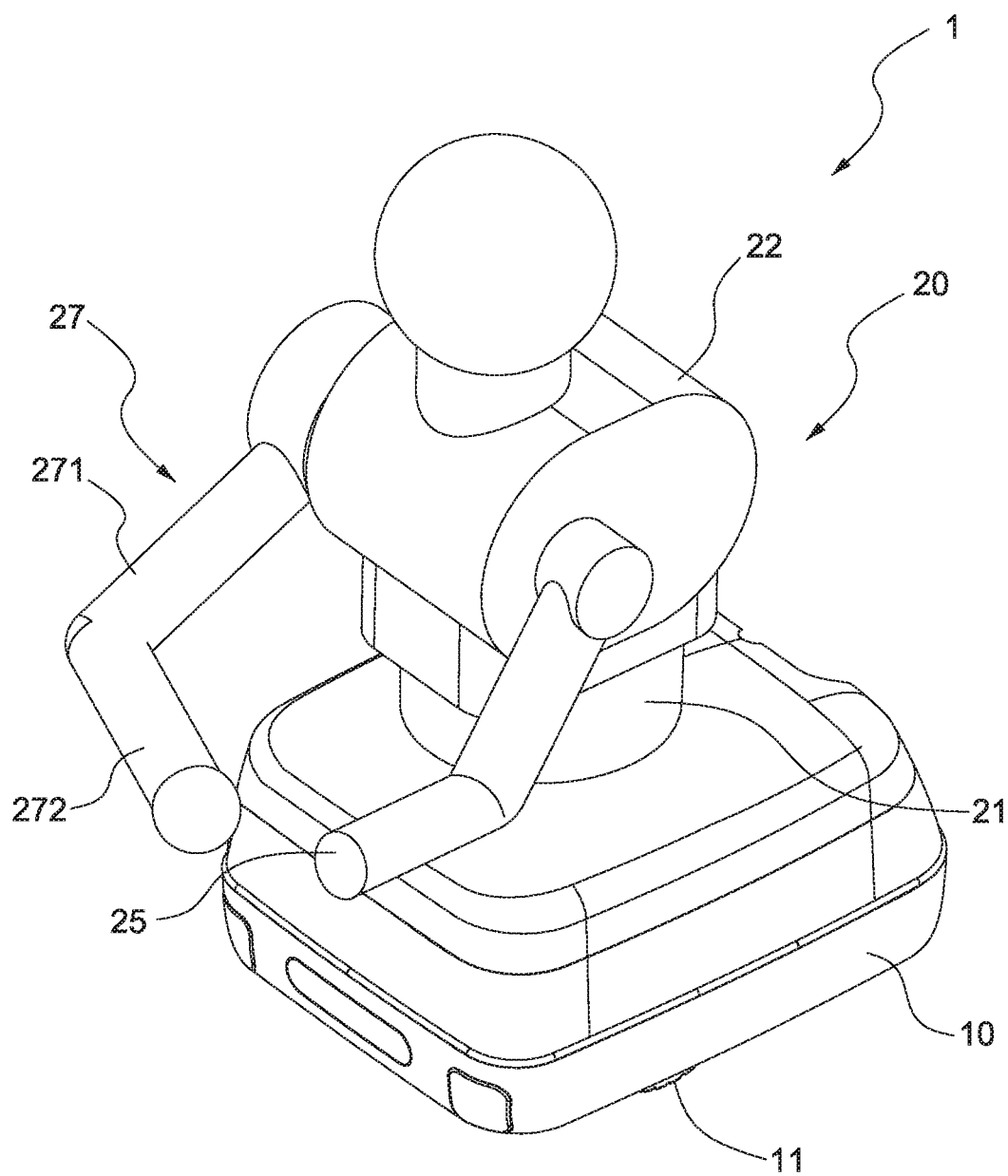
FIG. 6 is a perspective schematic view of a robot with a support in accordance with another embodiment of the instant disclosure.
Figure 7:
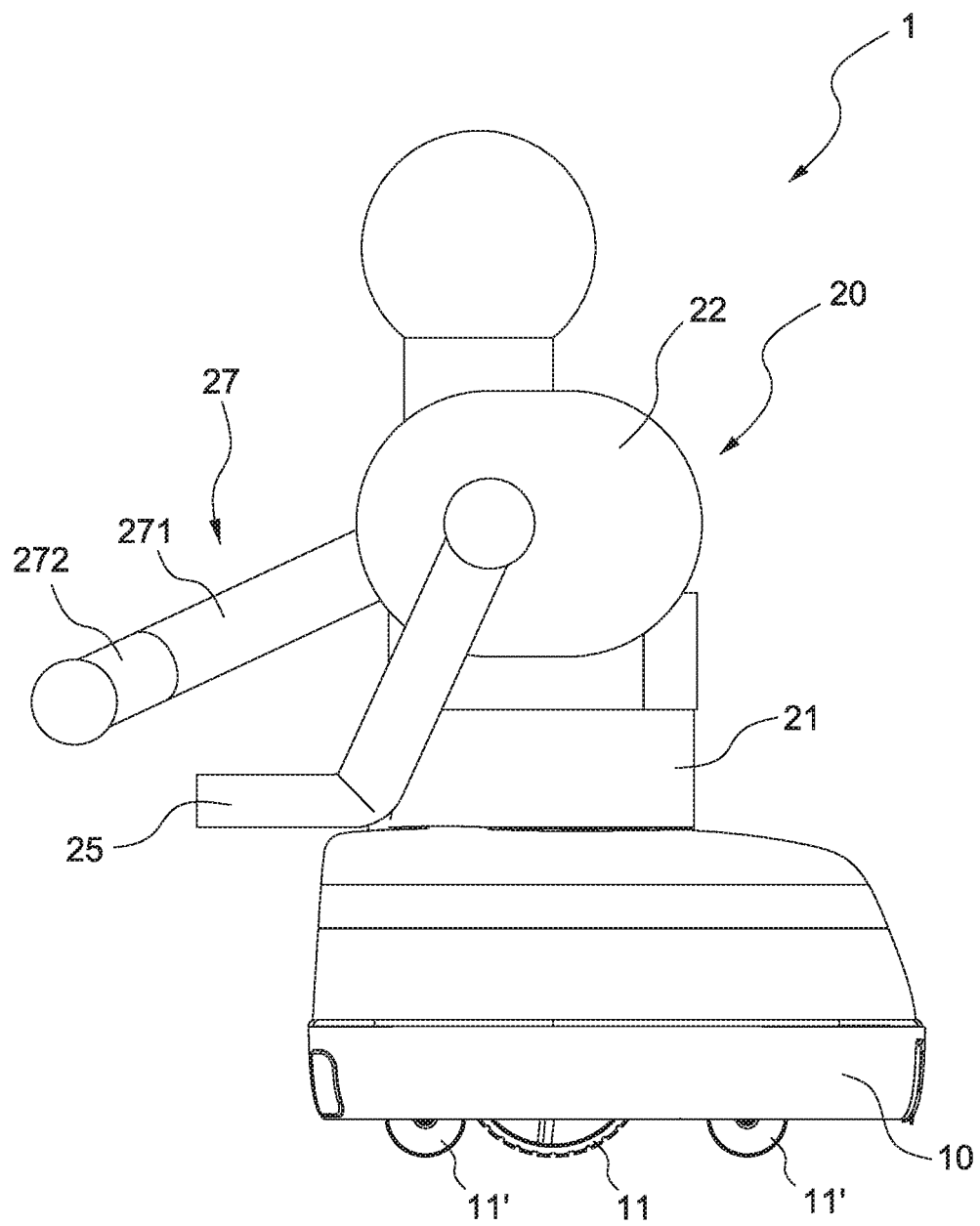
FIG. 7 is a side schematic view of a robot with a support in accordance with another embodiment of the instant disclosure.
Figure 8:
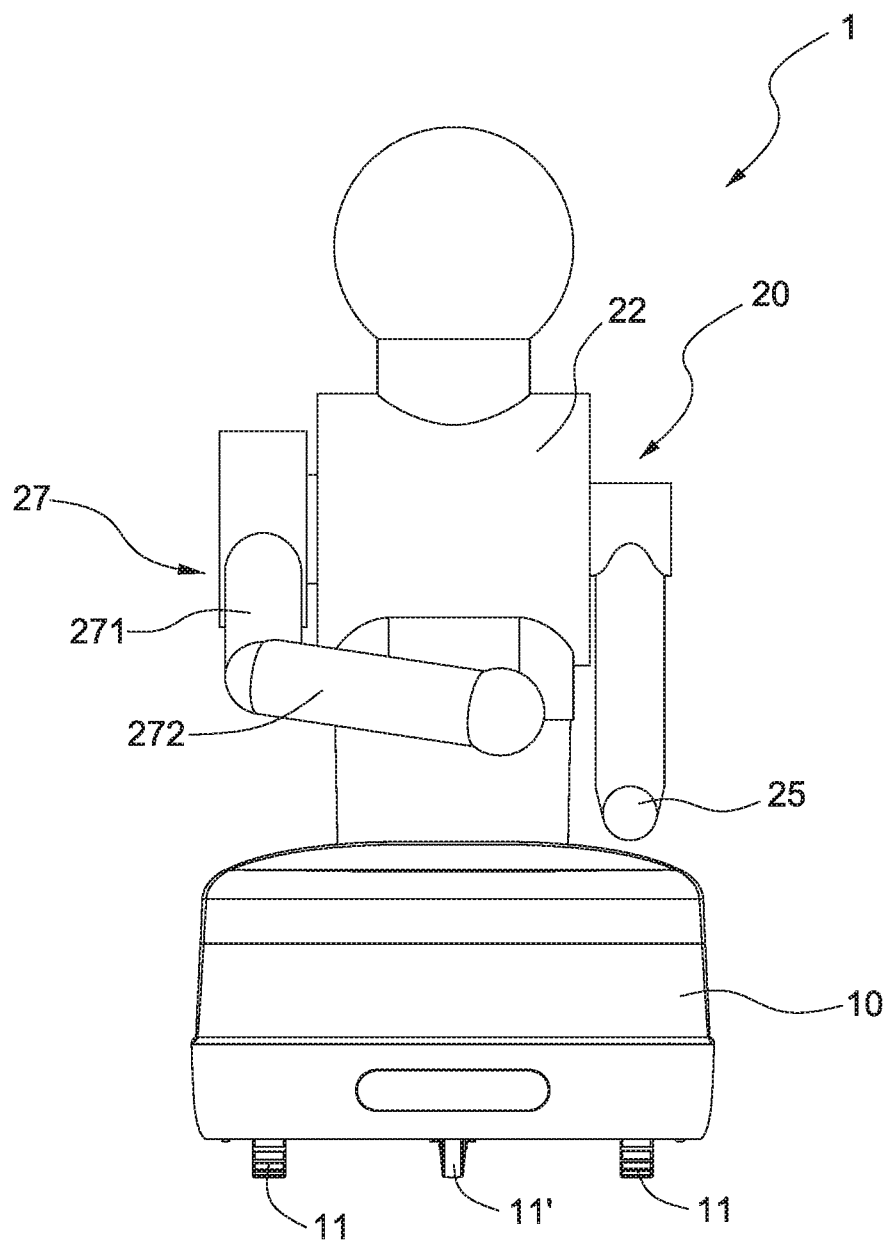
FIG. 8 is a front schematic view of a robot with a support in accordance with another embodiment of the instant disclosure.

FIGS. 6, 7 and 8 show a robot with a support in accordance with another embodiment of the instant disclosure. The robot 1 comprises a movable base 10 and a torso 20. The movable base 10 comprises a plurality of wheels 11 and 11' such that the robot 1 could be movable. The torso 20 comprises a lower portion 21 and an upper portion 22. The lower portion 21 is fixedly mounted to the movable base 10. The upper portion 22 is substantially installed to the lower portion 21. Such combination of the lower portion 21 and the second portion causes the torso 20 to be telescopic. Further, the robot 1 comprises a liner actuator 30 (see FIG. 4). The linear actuator 30 will drive the upper portion 22 to move relative to the lower portion 21 and along an axial direction of the torso 20. That is, the torso 20 could be variable in length when the upper portion 22 and the lower portion 21 are moved axially relative to each other in a telescopic manner by the linear actuator 30.

The robot 1 further comprises an arm-like support 25. The support 25 is substantially connected to one side of the upper portion 22 of the torso 20. Thus, the support 25 will move upwardly and downwardly when the upper portion 22 moves relative to the lower portion 21. Further, the support 25 can slightly move relative to the upper portion 22.

In addition, the robot 1 further comprises a robotic arm 27. The robotic arm 27 comprises an upper unit 271 and a lower unit 272. One end of the upper unit 271 is substantially connected to the other side of the upper portion 22 of the torso 20 and the other end of the upper unit 271 is connected to the lower unit 272. The upper unit 271 has at least one degree of freedom with respect to the upper portion 22 of the torso 20 and the lower unit 272 has at least one degree of freedom with respect to the upper unit 271. Moreover, since the robotic arm 27 is connected to the upper portion 22 of the torso 20, the robotic arm 27 will move upwardly and downwardly when the upper portion 22 moves relative to the lower portion 21.

Figure 9:
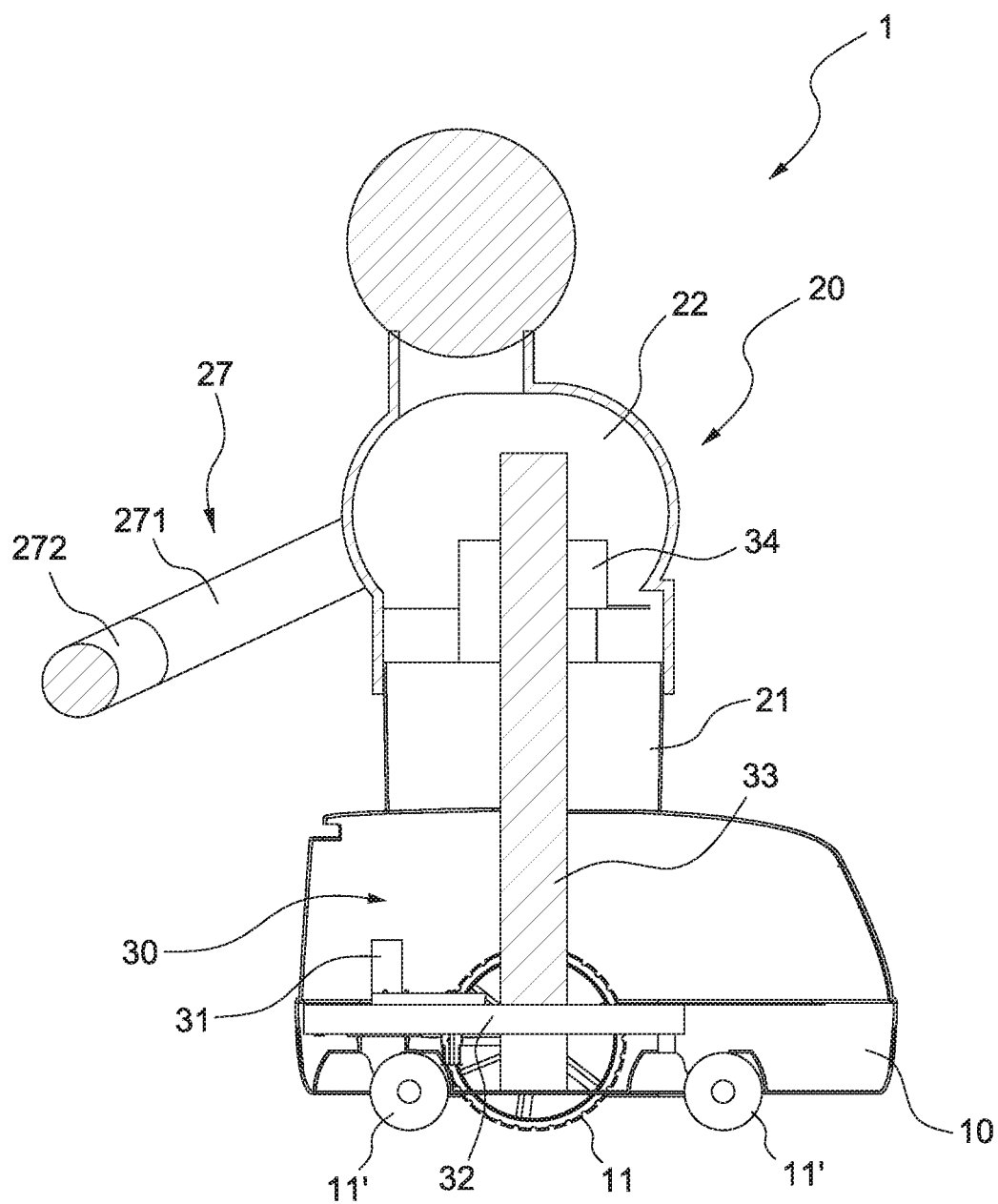
FIG. 9 is a schematic view showing a linear actuator arranged in a robot with a support in accordance with another embodiment of the instant disclosure.

FIG. 9 is a schematic view showing a linear actuator arranged in a robot with a support in accordance with another embodiment of the instant disclosure. The liner actuator 30 is arranged within the robot 1 and comprises a motor 31, a gear reducer 32, a screw rod 33 and a lifting platform 34. The motor 31 and the gear reducer 32 are substantially arranged within the movable base 10 and the motor 31 is connected to the gear reducer 32. The screw rod 33 is connected to the gear reducer 32 and axially extends into the interior of the torso 20. More precisely, the screw rod substantially extends along the longitudinal axis of the torso 20. The lifting platform 34 is screwed at the screw rod 33 and fixedly connected to the upper portion 22.

When the motor 31 is started, the gear reducer 32 will drive the screw rod 33 to rotate. Once the screw rod 33 rotates, the lifting platform 34 will move along the screw rod 33. Such linear motion of the lifting platform 34 will drive the upper portion 22 and the support 25 to move upwardly or downwardly relative to the lower portion 21. That is, when the liner actuator 30 is actuated, the upper portion 22 is axially moved relative to the lower portion 21 in a telescopic manner and thus the length of the torso 20 is varied. Meanwhile, the support 25 will be moved along with the movement of the second portion 21.

FIGS. 10A-10D show that a robot with a support in accordance with another embodiment of the instant disclosure moves/lifts an article.

Figure 10A:
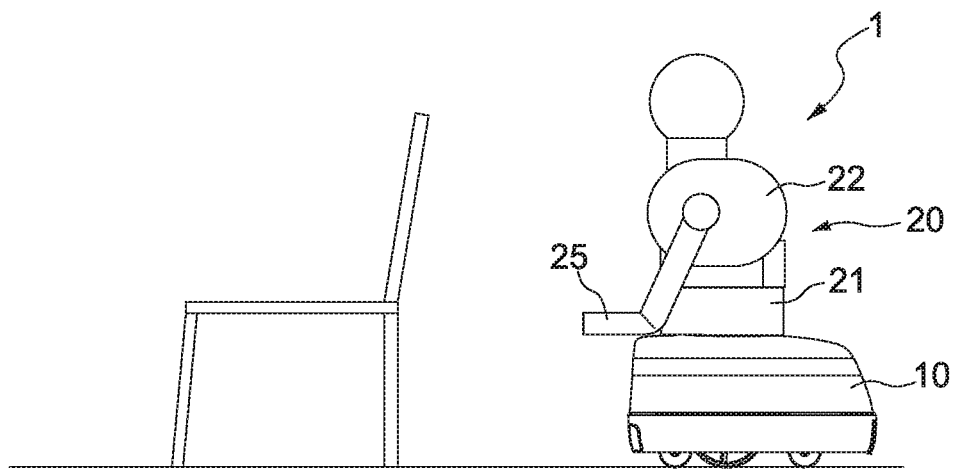
FIGS. 10A-10D are schematic views showing that a robot with a support in accordance with another embodiment of the instant disclosure moves/lifts an article.

Referring to FIG. 10A, when the robot 1 will move and/or lift an article, such as a chair 9, the robot 1 will move close to the chair 9 by the movable base 10.

Figure 10B:
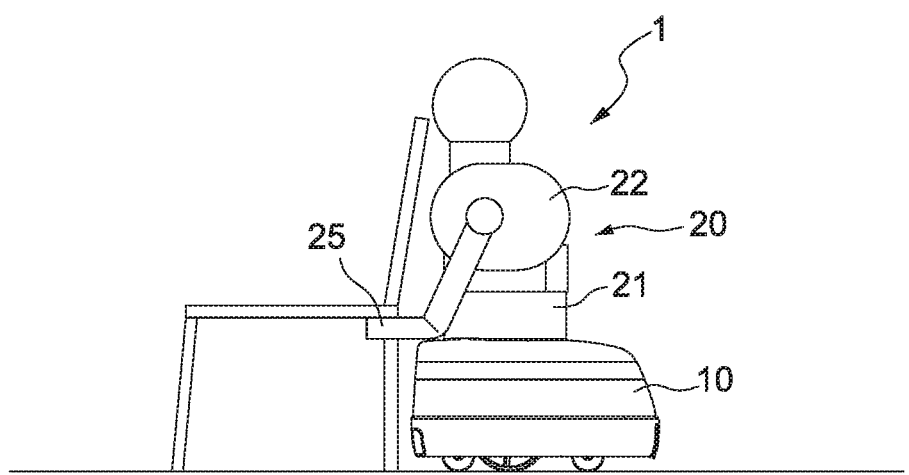

Referring to FIG. 10B, when the robot 1 moves close to the chair 9, the support 25 could be against the underneath of the chair surface of the chair 9.

Figure 10C:
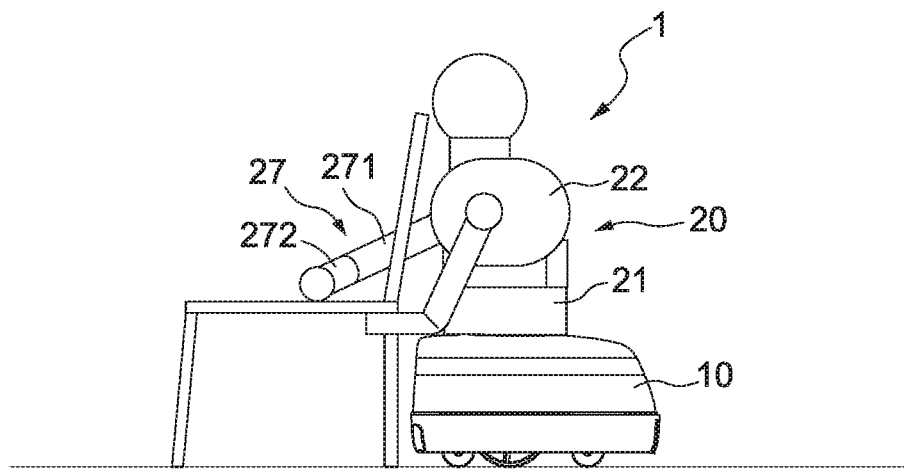

Referring to FIG. 10C, the robot 1 further moves the robotic arm 27 so as to support the chair back of the chair 9. In such a manner, the chair 9 is tightly held by the support 25 and the robotic arm 27 of the robot 1.

Figure 10D:
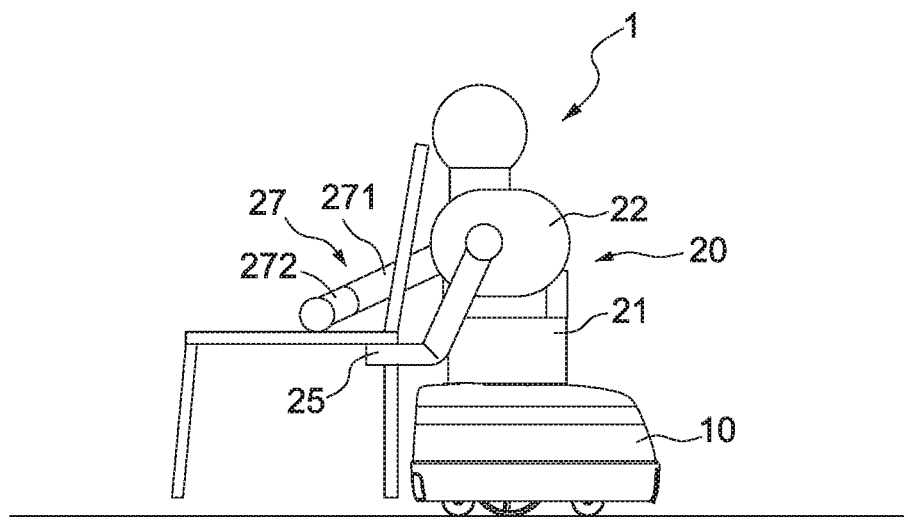

Referring to FIG. 10D, after the chair 9 is tightly held by the support 25 and the robotic arm 27 of the robot 1, the linear actuator 30 is actuated to drive the upper portion 22 to upwardly move relative to the lower portion 21. Meanwhile, the support 25 and the robotic arm 27 move up accordingly. Due to the upward movement of the support 25 and the robotic arm 27, the chair 9 is lifted up by the support 25 and the robotic arm 27 of the robot 1. After the chair 9 is lifted up by the support 25 and the robotic 27 of the robot 1, the robot 1 can further move the chair 9 to a desired place.

In addition, the robot 1 may further comprise an inertial measurement unit (IMU) sensor (not shown) for measuring the robot's specific force and angular rate during the handling process, or/and a sensor (not shown) for monitoring electrical characteristic of the support 23, or/and an optical sensor (not shown).

However, the above embodiments merely describe the principle and effects of the present disclosure, instead of being used to limit the present disclosure. Therefore, persons skilled in the art can make modifications and variations to the above embodiments without departing from the spirit of the present disclosure. The scope of the present disclosure should be defined by the appended claims.

What is claimed is:

1. A robot, comprising:
a movable base; and
a torso arranged on the base, the torso comprising:
a first portion mounted to the base,
a second portion installed to the first portion, wherein the second portion could be moved relative to the first portion, and
a support substantially connected to the second portion, wherein the support is substantially arranged at the front of the torso, and the support has a joint such that the support is foldable.

2. The robot of claim 1, further comprising a robotic arm connected to the second portion of the torso, wherein the robotic arm has at least one degree of freedom with respect to the second portion of the torso.

3. The robot of claim 2, wherein the robotic arm comprises a first unit and a second unit, wherein one end of the first unit is connected to the second portion of the torso and the second unit is connected to the other end of the first unit, and wherein the first unit has at least one degree of freedom with respect to the second portion of the torso and the second unit has at least one degree of freedom with respect to the first unit.

4. The robot of claim 1, wherein the support is disposed at one side of the torso.

5. The robot of claim 4, further comprising a robotic arm connected to the other side of the torso, wherein the robotic arm has at least one degree of freedom with respect to the torso.

6. The robot of claim 5, wherein the robotic arm comprises a first unit and a second unit, wherein one end of the first unit is connected to the torso and the second unit is connected to the other end of the first arm unit, and wherein the first unit has at least one degree of freedom with respect to the torso and the second unit has at least one degree of freedom with respect to the first unit.

7. The robot of claim 1, wherein the torso further comprises a linear actuator which can cause the second portion to move relative to the first portion.

8. The robot of claim 1, further comprising an inertial measurement unit (IMU) sensor.

9. The robot of claim 1, further comprising a sensor for monitoring electrical characteristic of the support.

10. The robot of claim 1, further comprising an optical sensor.

11. A robot, comprising:
a movable base;
a telescopic torso arranged on the base, wherein the torso has at least two portions arranged in a telescopic manner such that the torso is variable in length; and
a support mounted to the torso;
wherein the support moves upwardly and downwardly while a length of the torso is varied, the support is substantially arranged at the front of the torso, and the support has a joint such that the support is foldable.

12. The robot of claim 11, further comprising a robotic arm connected to the torso, wherein the robotic arm has at least one degree of freedom with respect to the torso and moves upwardly and downwardly while the length of the torso is varied.

13. The robot of claim 12, wherein the robotic arm comprises a first unit and a second unit, wherein the first unit is connected to the torso and the second unit is connected to the first unit, and wherein the first unit has at least one degree of freedom with respect to the torso and the second unit has at least one degree of freedom with respect to the first unit.

14. The robot of claim 11, wherein the support is disposed at one side of the torso.

15. The robot of claim 14, further comprising a robotic arm connected to the other side of the torso, wherein the robotic arm has at least one degree of freedom with respect to the torso and moves upwardly and downwardly while a length of the torso is varied.

16. The robot of claim 15, wherein the robotic arm comprises a first unit and a second unit, wherein the first unit is connected to the torso and the second unit is connected to the first arm unit, and wherein the first unit has at least one degree of freedom with respect to the torso and the second unit has at least one degree of freedom with respect to the first unit.

17. The robot of claim 11, wherein the torso further comprises a linear actuator which can cause the at least two portions of the torso to be displaced within one another in a telescopic manner.

18. The robot of claim 11, further comprising an inertial measurement unit (IMU) sensor.

19. The robot of claim 11, further comprising a sensor for monitoring electrical characteristic of the support.

20. The robot of claim 11, further comprising an optical sensor.

* * * * *